(12) United States Patent
Liu et al.

(10) Patent No.: US 7,568,102 B2
(45) Date of Patent: Jul. 28, 2009

(54) SYSTEM AND METHOD FOR AUTHORIZING THE USE OF STORED INFORMATION IN AN OPERATING SYSTEM

(75) Inventors: Zhengrong Liu, Foster City, CA (US); Nicholas Szeto, Dublin, CA (US); Shinichi Takemura, Kawasaki (JP); Yutaka Miyoshi, Fujisawa (JP); Tomoyuki Ono, Koshigaya (JP)

(73) Assignees: Sony Corporation, Tokyo (JP); Sony Electroinics, Inc., Parkridge, NJ (US)

( * ) Notice: Subject to any disclaimer, the term of this patent is extended or adjusted under 35 U.S.C. 154(b) by 641 days.

(21) Appl. No.: 10/893,765

(22) Filed: Jul. 15, 2004

(65) Prior Publication Data
US 2006/0015723 A1 Jan. 19, 2006

(51) Int. Cl.
*H04L 21/00* (2006.01)
(52) U.S. Cl. ..................................... 713/176
(58) Field of Classification Search .................. 713/176
See application file for complete search history.

(56) References Cited

U.S. PATENT DOCUMENTS

| | | | |
|---|---|---|---|
| 5,778,212 A | 7/1998 | Dehnert | |
| 6,334,213 B1 | 12/2001 | Le | |
| 6,708,330 B1 | 3/2004 | Moberg | |
| 6,745,307 B2 | 6/2004 | McKee | |
| 6,859,932 B1 | 2/2005 | Shann | |
| 6,988,250 B1 | 1/2006 | Proudler et al. | |
| 7,117,371 B1 | 10/2006 | Parthasarathy | |
| 7,143,289 B2 | 11/2006 | Denning | |
| 7,347,493 B2 | 3/2008 | Challener | |
| 7,350,072 B2 | 3/2008 | Zimmer et al. | |
| 7,376,974 B2 | 5/2008 | Proudler et al. | |
| 7,376,977 B2 | 5/2008 | Jindal | |
| 2002/0112158 A1* | 8/2002 | Golchikov | 713/164 |
| 2003/0196110 A1* | 10/2003 | Lampson et al. | 713/200 |
| 2004/0015884 A1 | 1/2004 | Shann | |
| 2005/0132031 A1 | 6/2005 | Sailer | |
| 2005/0204205 A1* | 9/2005 | Ring et al. | 714/47 |
| 2005/0262502 A1 | 11/2005 | Lari | |
| 2005/0273602 A1 | 12/2005 | Wilson | |
| 2006/0021065 A1* | 1/2006 | Kamperman et al. | 726/28 |
| 2006/0047958 A1 | 3/2006 | Morais | |
| 2007/0006150 A9 | 1/2007 | Walmsley | |

OTHER PUBLICATIONS

Daniel Polistchuck, "Writing custom data to executable files in Windows and Linuz", Nov. 26, 2001, Retrieved from <http://dn.codegear.com>, pp. 1-6.
"Expanded Executable Loadable Format Operating Header", IBM Technical Disclosure Bulletin, Sep. 1995, pp. 1-5.
Marius Van Oers, "Linux Viruses—EFL File Format", Virus Bulletin Conference, Sep. 2000, pp. 1-20.
Person, S. "Trusted Computing Platforms—TCPA Technology in Context" Prentice Hall PTR pp. 33-38, 85-90 145-163 (2003).

* cited by examiner

*Primary Examiner*—Andrew L Nalven
(74) *Attorney, Agent, or Firm*—Trellis IP Law Group, PC

(57) ABSTRACT

A method and apparatus for authorizing a file to use stored information for executing a process in a Linux operating system. The file includes an executable linking format, an application authorization data, and other attributes for the application.

21 Claims, 8 Drawing Sheets

SYSTEM AND METHOD FOR AUTHORIZING THE USE OF STORED INFORMATION IN AN OPERATING SYSTEM

BACKGROUND OF THE INVENTION

1. Field of Invention

Embodiments of the present invention broadly relate to a system and method for storing and authorizing the use of stored information in an operating system. More specifically, embodiments of the present invention provide a system and method for enabling a system to authorize a use of a stored secret before exposing it to an application.

2. Description of the Background Art

It is an important security measurement to protect in an operating system for a computer the integrity of executable files, together with their custom attributes and data. Usually, custom attributes and data are stored in separate files. The integrities of both original executables and their attributes should be protected. Many executable files including their associated attributes are security sensitive; thus, maintaining, two or more files separately makes the original executable files and their attributes more vulnerable to security attacks. Furthermore, when two or more executable files are separately maintained, they may easily become asynchronous as a result of being separately maintained.

One type of standard file format for storing executable binaries is Executable and Linking Format (ELF) of the Linux Operating System. Information and data are organized in an ELF file as sections, which are indexed in a section table. Some custom attributes and data for executable binaries may be stored in ELF while additional attributes and data of other executable binaries may be stored in other executable binary files. In an ELF file, as with files of other operating systems, separately maintaining the original executables and their attributes in the ELF file in conjunction with other files makes the ELF file and all additional files more vulnerable to security attacks, as well as exposing all files including the ELF file to becoming asynchronous with respect to each other as a result of being separately maintained.

SUMMARY OF EMBODIMENTS OF THE INVENTION

Embodiments of the present invention provide a method for authorizing an application program for a Linux operating system to use stored information. The method comprises providing an application program having a signature and used in executing a process in a Linux operating system, and associating stored information (e.g., a stored secret) with the signature of the application program so the application program may be used in a Linux operating system. The signature may comprise one of: a hash value, an encrypted secret, and a digital signature. Associating stored information includes decrypting sensitive content of the application program. In an embodiment of the invention where the signature comprises a hash value, the method may additionally comprise comparing the hash value of the application program with a hash value of an application that request the stored information.

Another embodiment of the present invention provides a method for authorizing a file to use stored information for executing a process in a Linux operating system. The method may comprise providing a file for executing a process in the Linux operating system and having an executable linking format and existing sections for data, and adding an application authorization data to the existing sections of the file so the file may use stored information (e.g., a stored secret) for executing a process in the Linux operating system. The method may further include adding customs attributes and data to the existing sections of the file to produce in the file an extended executable linking format in addition to the application authorization data. The application authorization data of the file may be compared with an application authorization data of an application that request the stored information. The application authorization data may comprise one of the following: arbitrary string used as an ID, an arbitrary string combined with a certificate associated with a signature on the file, and an arbitrary string combined with a domain name associated with the file.

Additional embodiments of the present invention provide a computer system comprising a Linux operating system using a file having an executable linking format, and application authorization data. Also provided is a machine-readable medium having stored thereon instructions for authorizing a file to use stored information for executing a process in a Linux operating system. The instructions include adding an application authorization data to existing sections of the file so the file may use stored information for executing the process in the Linux operating system.

Embodiments of the present invention further provide an apparatus for authorizing a file to use stored information for executing a process in a Linux operating system. The apparatus includes a file for executing a process in the Linux operating system and having an executable linking format and existing sections for data, and an application authorization data so the file may use stored information for executing the process in the Linux operating system.

Embodiments of the present invention also provide a system and method for storing in a single binary file custom attributes along with data to protect all of the stored information at the same time in the single binary file, while still maintaining backward compatible. Embodiments of the present invention further also provide a system and method for storing in an ELF for a particular file which is used to execute a process in the Linux Operating System, custom attributes and data of executable binaries already existing in the ELF for a particular file, along with information of executable binaries from one or more other files.

Embodiments of the present invention further also provide a method for adding sections to a format for a file used to execute a process in an operating system. The method comprises providing a file for executing a process in a Linux operating system and having an executable linking format and sections for data, and adding sections to the sections of the file. A process may be executed in the Linux operating system. The added sections may be indexed in an index section. The method may additionally comprise protecting the executable linking format including the added sections. Protecting the executable linking format may comprise assigning a hash value to the executable linking format, or inserting a digital signature into the executable linking format, or assigning a signing key to the executable linking format. If a digital signature is employed to protect the executable linking format, the digital signature may be removed from the executable linking format, and subsequently verified to produce a verified signature. After verification the removed digital signature may be reinserted into the executable linking format.

Embodiments of the present invention additionally provide a method for producing an extended executable linking format for a file used in executing a process in a Linux operating system. The method comprises providing a file for executing a process in the Linux operating system and having an executable linking format and sections for data, and adding customs attributes and data to the sections of the file to produce in the file an extended executable linking format for use in executing a process in the Linux operating system. The extended executable linking format may be protected, such as by a hash value. The method may additionally comprise protecting the hash value.

A further embodiment of the invention provides a method for protecting the integrity of a platform employed in executing a process in a Linux operating system. The method comprises providing a Linux operating system employing a platform having components, and protecting the components of the platform to produce a trusted platform used in executing a process in the Linux operating system. The components of the platform may be protected by a format selected from a group of formats consisting of a configuration file, an extended executable linking format, and a trusted executable format.

Embodiments of the invention further provide a computer system comprising a file for executing a process in the Linux operating system and having an executable linking format and sections for data. The file additionally has additional sections which have been added to the sections of the file.

Embodiments of the present invention also provide a machine-readable medium having stored thereon instructions for adding sections to existing sections of a file having an executable linking format and used in executing a process in a Linux operating system.

Embodiments of the present invention provide an apparatus for adding sections to an existing file for executing a process in an operating system. The apparatus comprises a file for executing a process in a Linux operating system and including an executable linking format having existing sections for data, and means for adding sections to the sections of the file.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may be any processor-containing device, such as a mainframe computer, a personal computer, a laptop, a notebook, a microcomputer, a server, or any of the like. A "computer program" may be any suitable program or sequence of coded instructions which are to be inserted into a computer, well know to those skilled in the art. Stated more specifically, a computer program is an organized list of instructions that, when executed, causes the computer to behave in a predetermined manner. A computer program contains a list of ingredients (called variables) and a list of directions (called statements) that tell the computer what to do with the variables. The variables may represent numeric data, text, or graphical images. If a computer is employed for synchronously displaying multiple video program ID streams, such as on a display screen of the computer, the computer would have suitable instructions (e.g., source code) for allowing a user to synchronously display multiple video program ID streams in accordance with the embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously displaying multiple video program ID streams, such as on a display screen, in accordance with various embodiments of the present invention.

Figure 1:
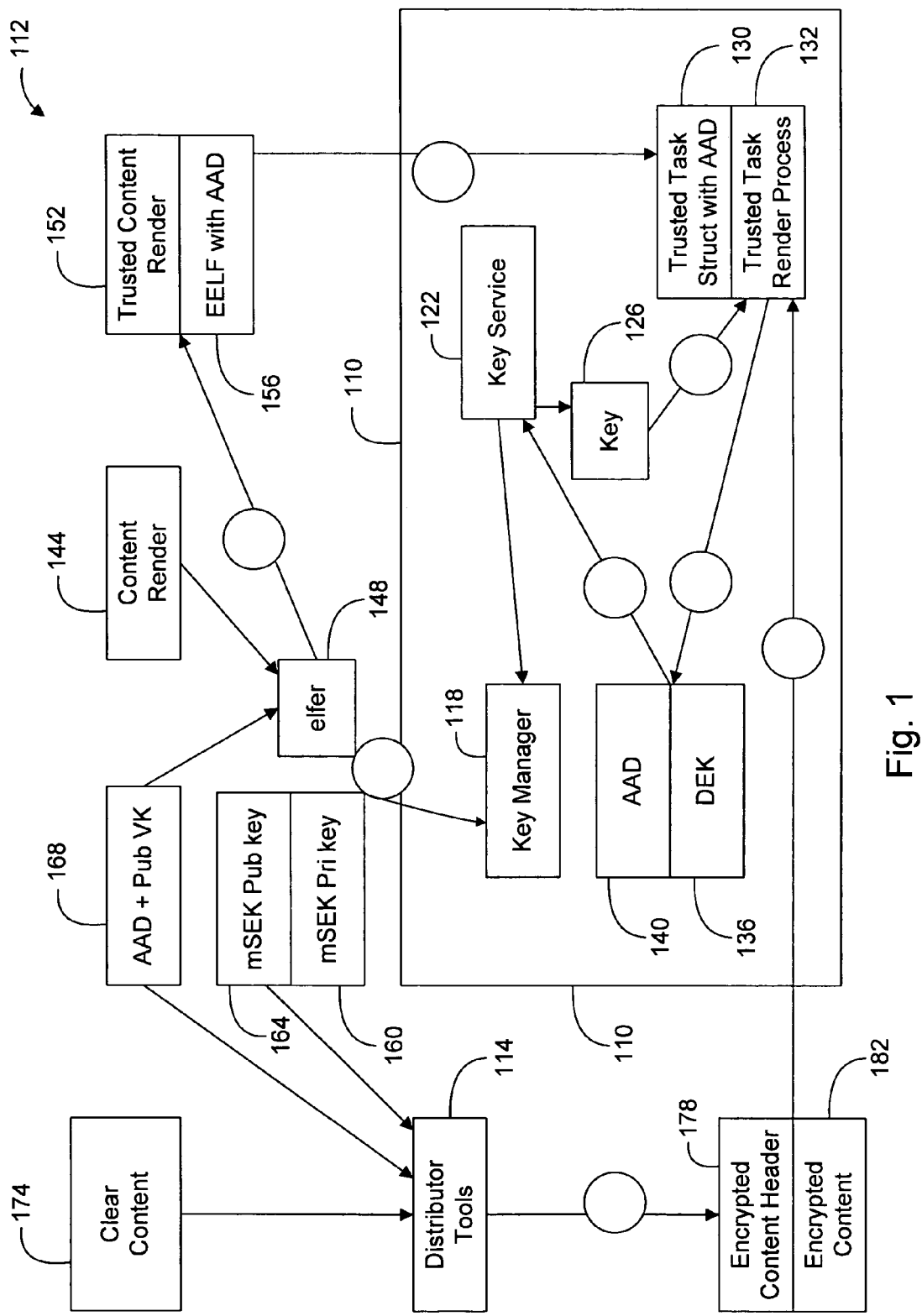
FIG. 1 is a schematic diagram of Operating System support modules of a trusted platform communicating with a content render library and with content distributor tools.

Referring now to FIG. 1, there is seen a schematic diagram of a trusted platform 110 communicating with a content render library 112, and with content distributor tools 114. The trusted platform 110 may be for any suitable platform of any Operating System. Similarly, the content render library 112 and the content distributor tools 114 may be any suitable respective content render library and content distributor tools of any Operating System. Preferably for various embodiments of the invention, the trusted platform 110, the content render library 112, and the content distributor tools 114 respectively comprise a trusted platform, a content render library, and content distributor tools for the Linux Operating System. While preferred embodiments of the invention will be explained for the Linux Operating System, it is to be understood that the spirit and scope of embodiments of the present invention are not to be limited to the Linux Operating System. The Linux Operating System in fully described in "Understanding the Linux Kernel" by Daniel P. Bovet & Marco Cesati, published by O'Reilly, fully incorporated herein by reference thereto as if repeated verbatim immediately hereinafter.

The trusted platform 112 comprises a key manager 118, a key service 122, a key 126, a trusted task structure 130 having application authorization data, a trusted content render process 132, content or data encryption key (DEK) 136, and an application authorization data 140. The content render library 112 comprises content render 144, elfer 148, trusted content render 152, extended ELF (EELF) 156, private key 160 (i.e. secret encryption key (SEK) private key), public key 164 (i.e. secret encryption key (SEK) public key), and AAD-public key 168 (i.e., public vendor key (VK)). The content distributor tools 114 comprises distributor tool 115 which generates from clear content 174 and the keys (i.e., private key 160, public key 164, and AAD-public key 168) encrypted content header 178 and encrypted content 182.

Figure 2:
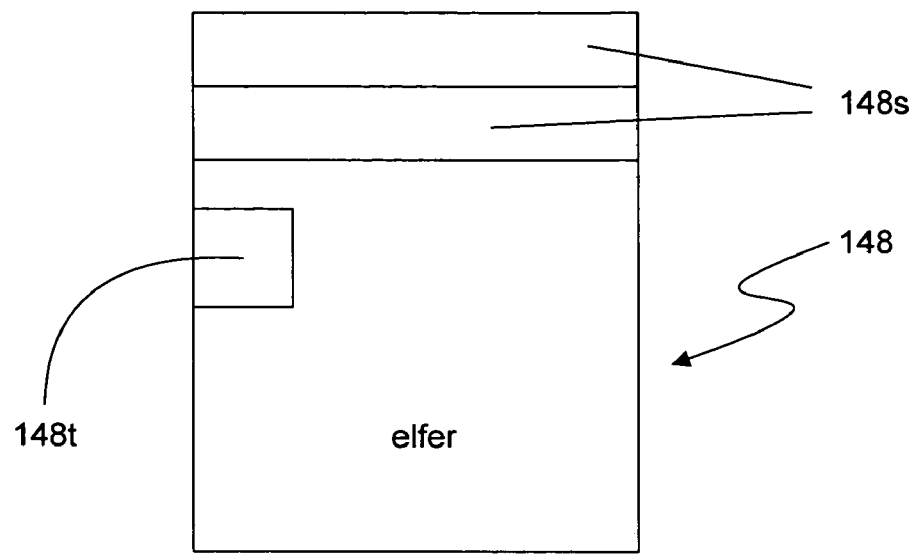
FIG. 2 is a schematic diagram of an embodiment of the elfer.
Figure 3:
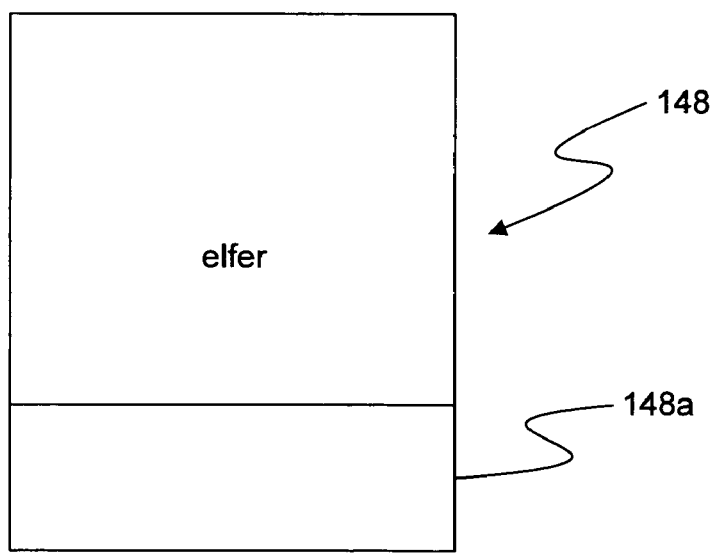
FIG. 3 is a schematic diagram of another embodiment of the elfer.

Elfer 148 includes a standard format for storing executable binaries. As illustrated in FIG. 2, information and data in elfer 148 are organized in a file as sections 148s, which are indexed in a section table 148t. In elfer 148 some custom attributes and data for an executable binary may be stored along with rest of the information of the executable binary in the same binary file. In an embodiment of the invention and as illustrated in FIG. 3, additional sections 148a (e.g. additional bytes of hardware) can be inserted into an existing executable binary without destroying the original program logic. In an embodiment of the invention, insertion of additional sections 148a may include modification to the section table 148a to maintain the integrity of the executable. For this embodiment however, the same executable image is preferably generated from the files before and after the insertion of the additional sections 148a. It is to be understood that additional sections 148a may include any suitable information, such as, by way of example only, information for the operating system or any other suitable application. This embodiment of the invention may be employed with trusted platforms, such as trusted platform 110, where integrity of security sensitive applications and their protection attributes need to be simultaneously protected together. For example, a DRM application has special protection requirements to the operating system, so that the operating system knows how to enforce the special protection requirements. Protection attributes may be inserted or added to elfer 148 to protect the operating system.

For embodiments of the present invention, the integrity of the files in elfer 148, either before or after the insertion of additional sections 148a, may be protected by various means. In one embodiment of the invention, a hash value of the files in elfer 148 can be used to protect the integrity of the files. Because custom attributes are part of the same binary file, the integrity of both original executable and its attributes are protected together.

In another embodiment of the invention, a digital signature may be employed, either alone or in combination with a hash value, to protect the integrity of elfer 148. After the signature is signed, it may be inserted into elfer 148. In order to verify the signature, the signature may be initially removed from the ELF 148 through the assistance of network connections, and subsequently returned after verification to elfer 148 in the state when it was originally signed. An advantage of this procedure for protecting the integrity of files within elfer 148 is that third party vendors may sign and distribute their applications.

In yet another embodiment of the invention, the integrity of elfer 148 may be protected by assigning the files of the elfer 148 with a signing key that is known only to the intended system which is capable of subsequently verifying the integrity of the files of the elfer 148. By way of example only, in a trusted platform, such as trusted platform 110, the operating system can take the responsibility of maintaining the signing key.

If a hash value of the files in elfer 148 is used to protect the integrity of the files, the hash value and/or related information must be stored and protected. If the elfer 148 is employed with a trusted platform, such as trusted platform 110 in FIG. 1, the trusted components within the trusted platform, are preferably verified in each step during the boot sequence. The hash values of the components are extended into the process content renders (PCRs). After a trusted kernel takes the control of the trusted platform 110, the kernel assumes the responsibility of verifying the integrity of additional components, such as kernel modules, libraries, and trusted applications. In order for the kernel to verify the integrity of a particular component, the hash value of the particular component needs to be protected. For the trusted platform 110, which preferably comprises a trusted Linux platform, the integrity of a particular component (e.g., a hash value of a particular component) may be protected by Configuration files, by Extended Executable Linking Format (EELF), or by Trusted Executable Format (TEF).

Figure 4:
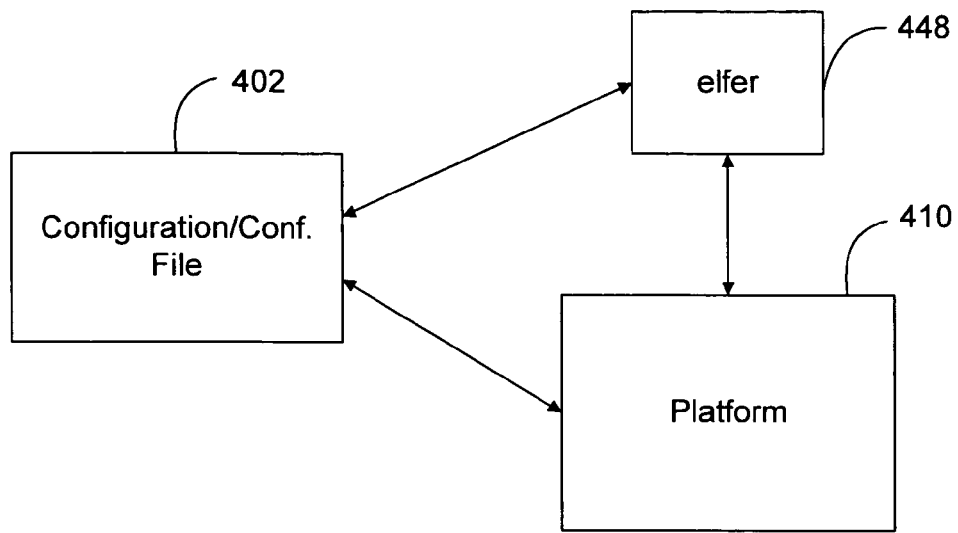
FIG. 4 is a schematic diagram of a configurator, an elfer, and a trusted platform.

Referring now to FIG. 4 there is seen a configurator 402, elfer 448 and trusted platform 410. The configurator 402 has a Configuration file. If a hash value of a particular component is to be protected by a Configuration file, the Configuration file is preferably protected by extending its hash value to a PCR (process content render) or by using a digital signature. Because a single configuration file may be used for multiple protection targets, the Configuration file is preferably updated and re-protected each time there is a change to the target files.

Figure 5:
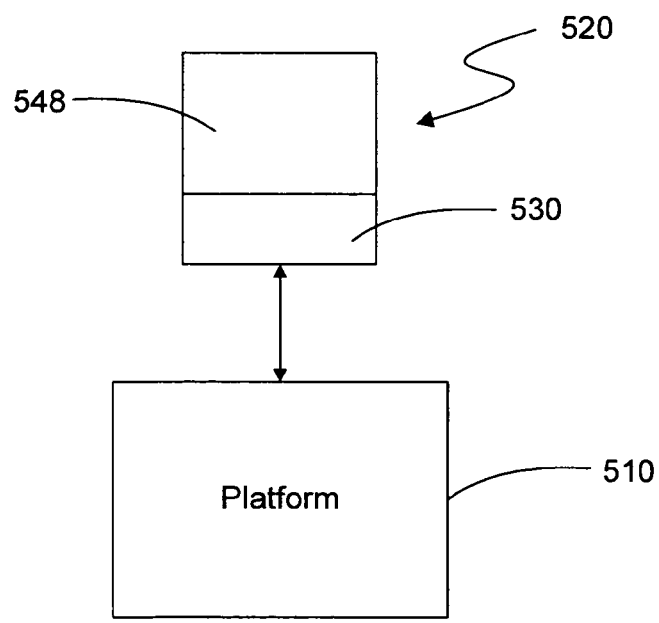
FIG. 5 is a schematic diagram of an embodiment of the EELF.
Figure 6:
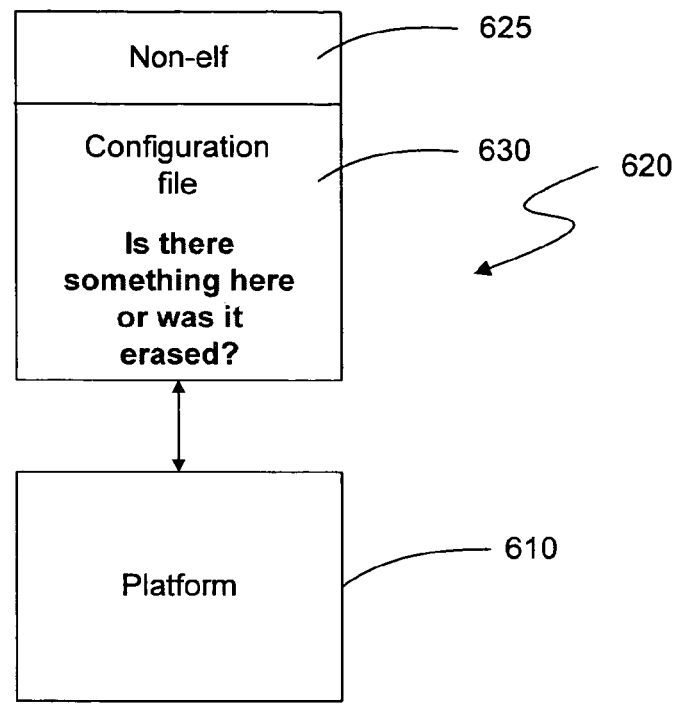
FIG. 6 is a schematic diagram of a non-elfer and a trusted platform.

Referring now, to FIG. 5 there is seen an Extended Executable Linking Format (EELF 520) and trusted platform 510. EELF 520 includes ELF 548 and a Configuration file 530. If a hash value of a particular component is to be protected by an EELF, the information in the Configuration file, together with its ELF executable, is placed in a single file. This procedure protects both the target and the configuration in a single file. For embodiments of the invention where a hash value of a particular component is to be protected by non-ELF files, the information in the Configuration file, together with its non-ELF executable, is placed in a single file, as best illustrated in FIG. 6 where there is seen a trusted platform 610, and non-ELFer 620 having non-elf files 625, and a Configuration file 630.

Figure 7:
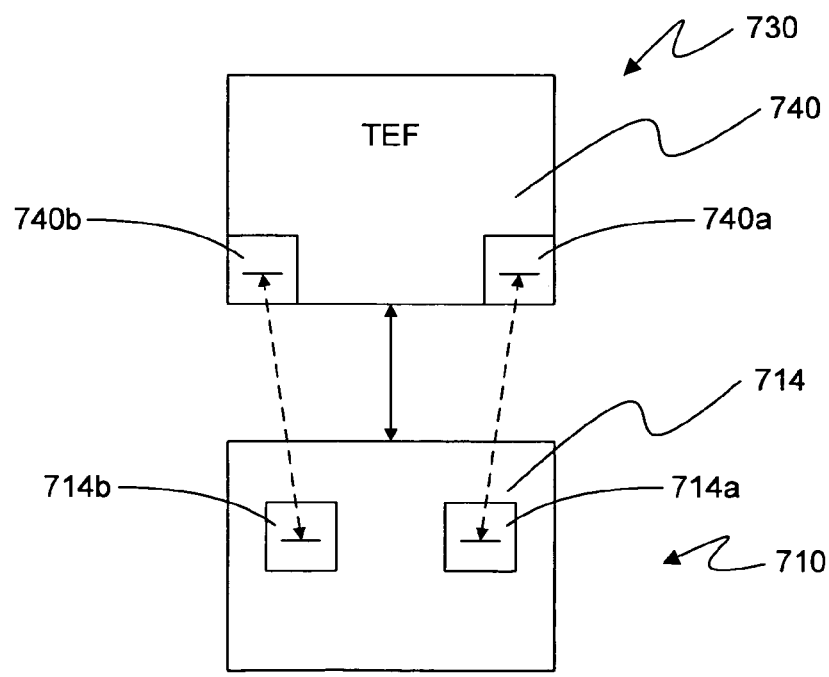
FIG. 7 is a schematic diagram of TEF and a trusted platform.

For embodiments of the invention where a hash value of a particular component is to be protected by The Trusted Executable Format (TEF), only one Configuration file is employed for a single target within a trusted platform. In FIG. 7 there is seen trusted platform 710 and The Trusted Executable Format (TEF 720). The trusted platform 710 includes a plurality of targets 714, such as targets 714a and 714b. TEF 730 comprises a plurality of Configuration files 740, such as Configuration files 740a and 740b. As illustrated in FIG. 7, Configuration files 740a and 740b are mapped directly to targets 714a and 714b since only one Configuration file is employed for a single target within trusted platform 710.

In another embodiment of the present invention the Executable Linking Format (ELF) (e.g., elfer 148 in FIG. 1), includes targets which are to be protected. Representative protection targets include kernel modules, libraries, trusted and sensitive applications. Protection targets in ELF may be protected by extending the ELF file to produce an Extended Executable Linking Format (EELF), generally illustrated as 820 in FIG. 8. The ELF file may be extended by attaching additional information at the end of the ELF file without altering the execution format of the ELF file. EELF 820 maintains backwards compatibility since an existing executable engine will still be functional regardless of the additional information at the end of the ELF file.

Figure 8:
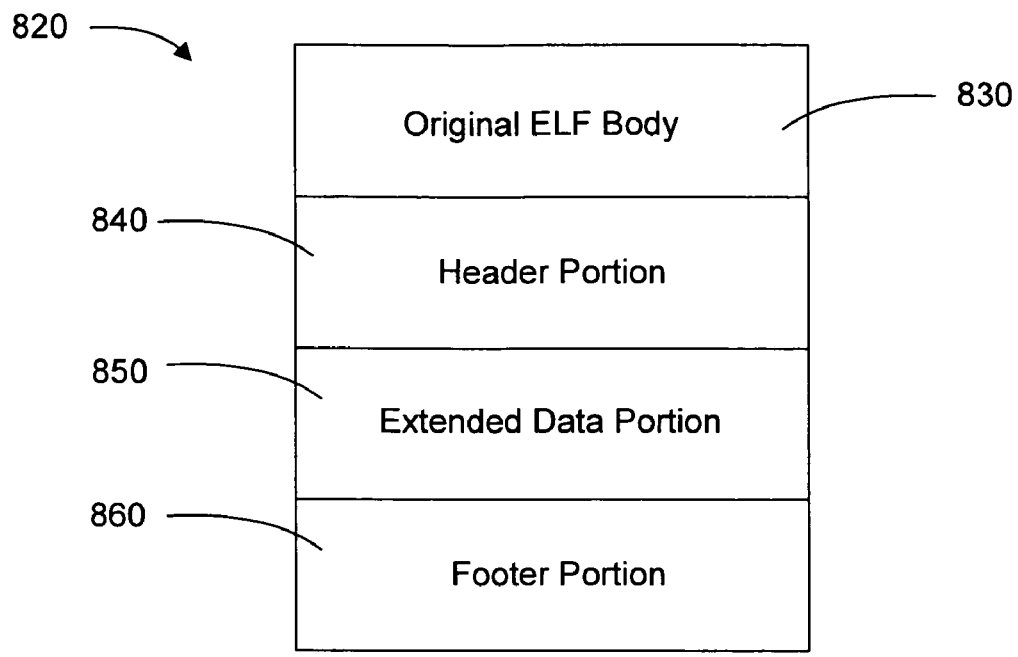
FIG. 8 is a schematic diagram of another embodiment of the EELF.

EELF 820, as illustrated in FIG. 8, includes original ELF body 830, a header portion 840, an extended data portion 850, and a footer portion 860. The header portion 840 comprises particular information which is located in the extended data portion 850. The footer portion 860 is formatting which is included at the end in EELF 820 because respective sections within EELF 820 vary in length. Thus, the footer portion 860 provides the information to locate the beginning of the EELF 820.

Figure 9:
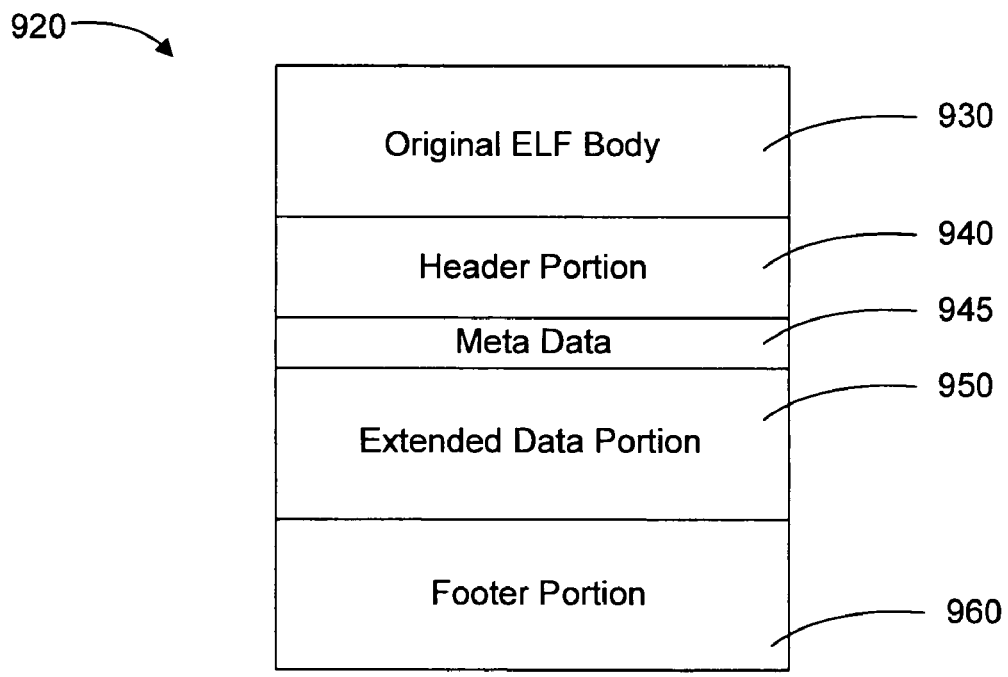
FIG. 9 is a schematic diagram of another embodiment OF Trusted Executable Format (TEF).

The extended data portion 850 may include one or more of the following sections:
  Security Settings for the file
  Encrypted Encryption Keys (encrypted key used to encrypt all or a portion of the data)
  Digital Signature of original ELF file
  Digital Signature of extended ELF file (original ELF file+ extended portion)
  Hash Value of the original ELF body
  Hash Values of the original ELF sections In an embodiment of the invention and as previously indicated, while EELF (e.g., EELF 820) have features to protect the integrity of files used in the trusted platform, these integrity protection mechanisms may be replaced with a single protection mechanism called Trusted Executable Format (TEF) which is an alternative protection mechanism to employing EELF and is a variation of EELF 820. The Trusted Executable Format (TEF) is generally illustrated as 920 in FIG. 9 and broadly comprises EELF 820 and Meta Data 945 added to the header portion 840 of the EELF 820. More specifically and as best illustrated in FIG. 9, TEF 920 comprises original ELF body 930, header portion 940 including added Meta Data 945, extended data portion 950, and footer portion 960. The Meta Data 945 may be used to specify multiple related files (including executable file, configuration file, etc.) of different formats. By the use of Meta Data 945 in the header portion 940, one format may be used to securely support executable files and all of the data formats, such as non-executable files, beyond the limits of EELF 820.

In an embodiment of the present invention, TEF 920 comprises a superset of EELF 820 by supporting all the data formats that are beyond the limits of EELF 820. As indicated, TEF 920 comprises header portion 940 that may be specified in a format of Meta Data 945 (such as in SML format). It is to be understood that all the sections at the end of the EELF 820 may be included in the header portion 940 of TEF 920. The header portion 940 may include a generic file descriptor, which may be used to specify what type of file it is (including executable file, configuration file, etc.) and its format, as well as the security and integrity protection data. Data that is used as management information to describe files in this manner comprises Meta Data 945. Current Linux implementations support multiple executable formats, such as ELF, a out, perl, script, etc. To support TEF 920, Linux loaders are preferably enhanced in order to process the Meta Data 945 contained in the header portion 940 in order to delegate the execution to the existing execution engines. A benefit to this embodiment of the invention is that by defining a new file format with security and protection data, one can extend the system protection to all types of files.

Another aspect of the present invention provides for a system and procedure for protecting an encryption secret so that only a target application may access the secret and use it to decrypt the content for rendering. Thus, only a target application would be authorized to use the secret. In an embodiment of the present invention a system and method that enables a target application to authorize encryption/decryption of data employs a single authorization phase comprising Application Authorization Data (AAD). For various embodiments of the present invention, characteristics of the AAD include: (i) the AAD is used for the purpose of authorization; (ii) the AAD is certified by the trusted system; (iii) the AAD is added to the application executable; and (iv) the AAD is also combined with the encrypted secret, more specifically by associating an encryption secret with a signature of a target application. The term "signature" may be a simple hash or digital signature of the target application.

Figure 10:
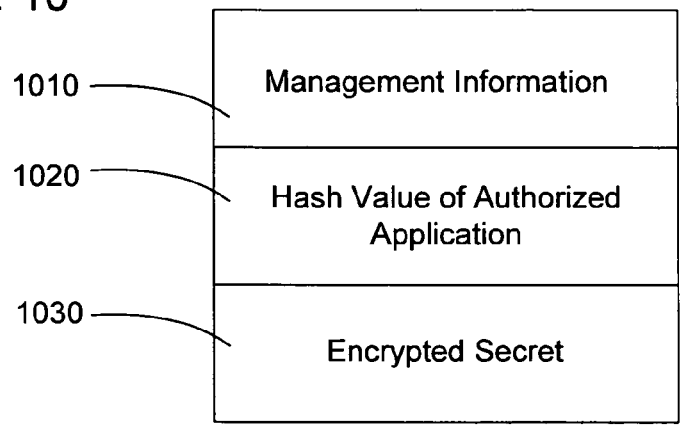
FIG. 10 is a schematic diagram for an encrypted blob.

One of the AAD basic mechanisms for a sensitive application to authorize the use of a secret to decrypt sensitive content is to use the hash value of the application for authorizing the use of a secret to decrypt sensitive content. The secret is combined with the hash value of the application and is encrypted using an encryption key to create an encrypted blob, generally illustrated as 1000 in FIG. 10. Encrypted blob 1000 before encryption comprises management information 1010, hash value 1020 of authorized application, and encrypted secret 1030. In an embodiment of the invention, only the entity with the Encryption Key can decrypt the encrypted blob 1000. The entity usually includes a supporting function that must verify the authenticity by comparing the hash value 1020 of the authorized application from the encrypted blob 1000 and the hash value of the application that requests the secret. The entity returns the secret to the application only if the two hash values match. Otherwise, an error is generated.

Another of the AAD basic mechanisms for a sensitive application to authorize the use of a secret to decrypt sensitive content is to use an encrypted hash (i.e., a digital signature) of the protected entity. To protect the content encryption secret with an encrypted hash (i.e., a digital signature) is an indirect association with the hash of the target entity.

Figure 11:
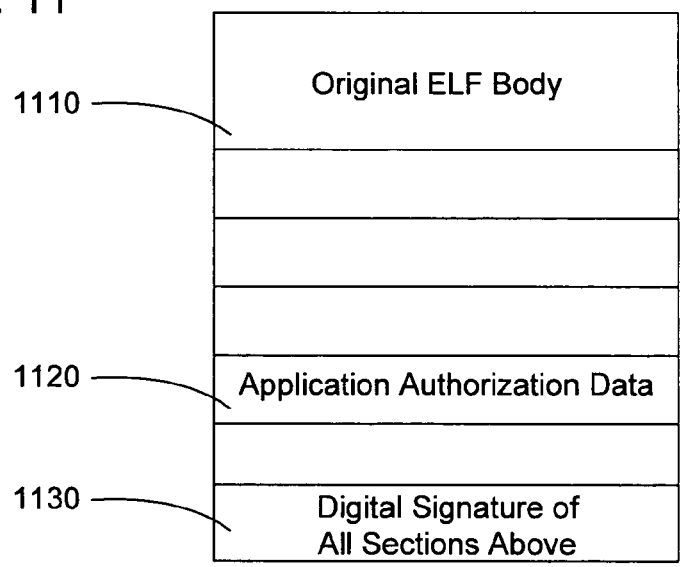
FIG. 11 is a schematic diagram of an EELF format having the AAD.

In another embodiment of the invention, a sensitive application may authorize the use of a secret to decrypt sensitive content by embedding AAD in the target application. The EELF data may be signed for certifying the AAD value from the entity that signed the file. An EELF format having AAD is generally illustrated as 1100 in FIG. 11. The EELF format 1100 may include original ELF body 1110, AAD 1120, and a digital signature 1130 for all prior sections within the EELF format 1100. Thus, in the encrypted blob 1000, the AAD 1120 is used in place of the hash value 1020 of the application for the authentication process.

Figure 12:
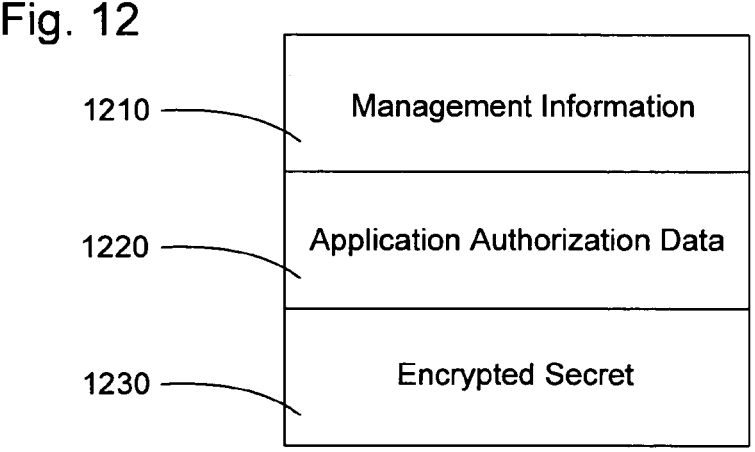
FIG. 12 is a schematic diagram for an unencrypted blob.

Referring now to FIG. 12, there is seen schematic diagram of an unencrypted blob 1200 after the encrypted blob 1000 has been unencrypted. Unencrypted blob 1200 comprises management information 1210, AAD 1220, and encrypted secret 1230. In an embodiment of the invention the OS kernel may be responsible for verifying the authorization to access secrets and includes the Encryption Keys. An OS application loader may store the AAD 1220 from the application (read from the Extended ELF data) in the extended process data structure. To decrypt sensitive information, a target application may load the secret or encrypted blob 1000 and request the OS to decrypt the content secret. When a secret is requested for access by this application, the AAD value in the secret blob 1000 is compared against the AAD of the application in the process data structure. The secret may only exposed to the requesting application if the two AAD values match. Otherwise, an error could be generated.

In various embodiments of the present invention, there are different variations or methods on how AAD may be constructed. In one method, the AAD may be an arbitrary string, which would be used solely as the ID. The ID would used in the Kernel to determine if the secret contained in the secret blob should be exposed to the application. The secret would only be exposed to applications with the same AAD. For this embodiment of the invention, multiple applications may share a single AAD.

In another method, the AAD may be an arbitrary string combined with the certificate associated with the signature on the application. In this method, the data structure for the Extended ELF may be same data structure of EELF 1100 in FIG. 11. The encrypted blob would have an additional certificate. The kernel could determine if the arbitrary string and the certificate contained in the blob match with the application that request the secret before exposing the secret to the application. As a result, the encrypted content could only be decrypted by applications with the same magic string and the certificate. This would bind the AAD with the certificate and would eliminate any problem of a valid signature being used with an incorrect magic string. Alternatively, and in another embodiment, a public key of the certificate may be employed instead of the certificate itself in the encrypted blob.

In yet another method, the data structures may be the same in both the Extended ELF and the secret blob after replacing the certificate part with the domain name. By way of example only, a value of AAD in the secret blob may be a string in the format domain_name.authorization_phase, where the "domain_name" may be the valid domain name of the application vendor, which therefore should match with the domain name found in the certificate associating with the signature of the application. The "authorization_phase" may be any string, such as "com.sony.dvd_player." The domain name portion of the AAD may be verified against the certificate owner that is used to verify the digital signature of the software or application. If the domain names match, the AAD is valid. If the domain names do not match, the AAD is not valid and the application is not authorized to access secrets. This procedure may be used to prevent one sensitive application vendor from using the same AAD of an application from another vendor. Otherwise, the second vendor could be able to import an application with the AAD from the first vendor, and the second vendor's application could be used to reveal secrets targeted for the application from the first vendor. This method would still allow the sharing of magic strings for applications from same domain.

Referring again now to FIG. 1, elfer 148 preferably includes one or more functions for adding AAD 140 into sections of EELF 156. A trusted application loader could store the AAD 140 in the process data structure when loading the application. An API (Application Programming Interface) could be provided to Key Service 122 to access the AAD 140 of a rendering application process. As previously indicated the AAD 140 may be in the form Domain_name.authorization_phase. By way of example only, the AAD 140 for a Sony DVD player may appear as Com.sony.DVD_PLAYER_AUTH_DATA. As also previously indicated, this name convention may be used to prevent one sensitive application vendor from using the same AAD of an application from another vendor. Otherwise, the second vendor would be able to create an application with an AAD from the first vendor. This application may be used to reveal the secrets targeted to the application from the first vendor. This name convention also produces potential AAD conflictions from different vendors. The domain_name portion of the AAD 140 may be used by a trusted application loader to verify the AAD 140 against the signer in the certificate that is used to sign the render application. The public (VK, vendor key) 164 key may be included in the content encryption header with the AAD 140. Generally, content would be encrypted for applications that are signed by a vendor.

Continuing to refer again to FIG. 1, content distributor tools 114 take the clear content 174, public mSEK 164, a content encryption key, and one and more sets of combination of (AAD+public VK) 168 as inputs. The content encryption key may be an optional input item. If an encryption key is not included, it is generated on-the-fly. The content encryption key is typically symmetric and is used to encrypt the content. The encrypted content is pre-pended with a header. The header includes the content encryption key, encrypting algorithm, one or more sets of AAD and public VK combinations for potentially multiple targeting render applications. Multiple public VKs allow the encrypted contents shared between several render applications from different vendors. The header itself may be encrypted using the mSEK public key (e.g., mSEK Pub key 164) of the target platform (e.g., trusted platform 110). In an embodiment of the present invention, the structure of the header may generally be illustrated as 1300 in FIG. 13. The header 1300 may include encryption header magic number 1310, content encryption key 1320, encryption algorithm 1340, AAD1 1350, pub VK1 1360, AAD2 1365, PUB VK2 1370, AADn 1380 and Pub VKn 1390.

Figure 13:
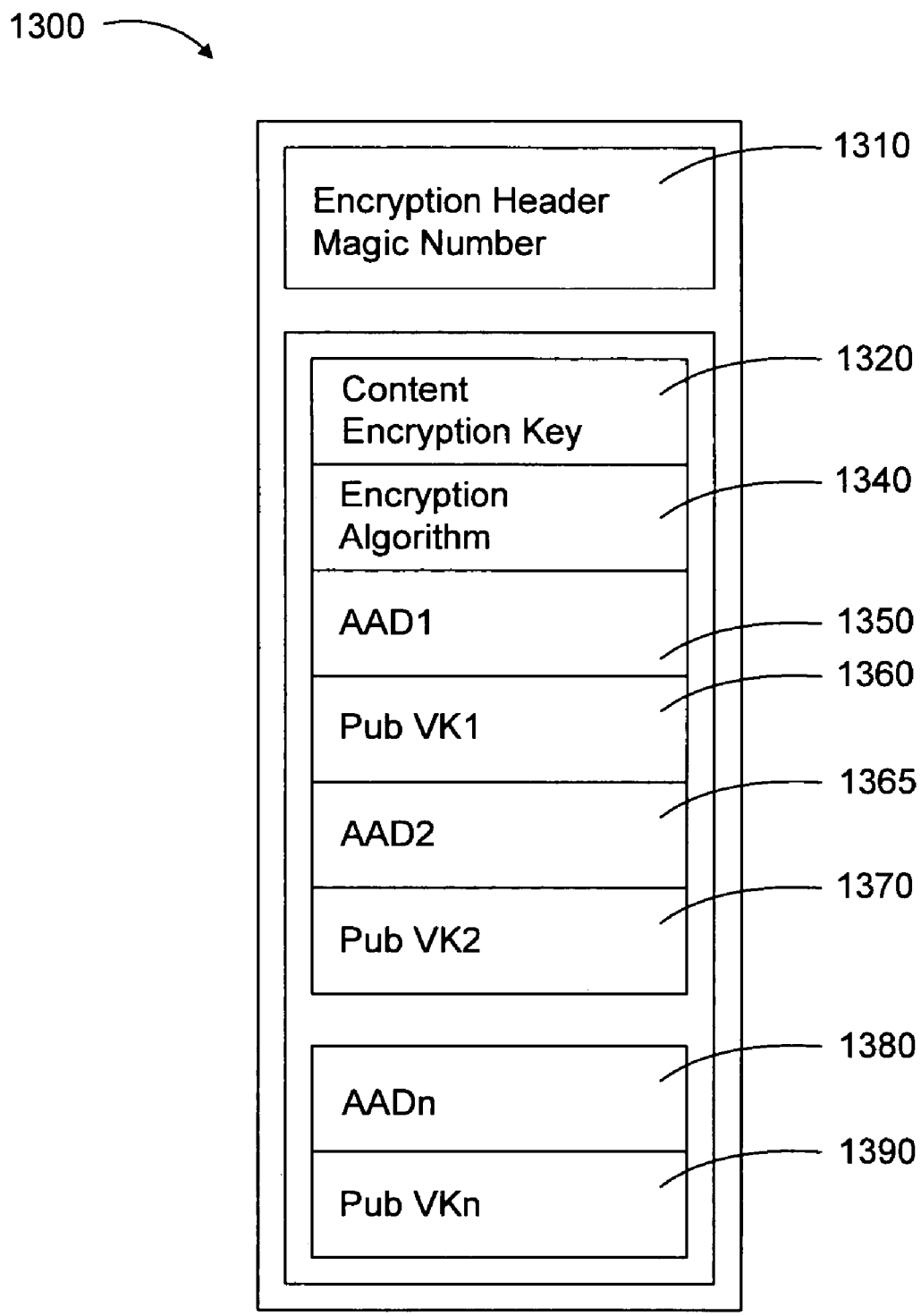
FIG. 13 is a schematic diagram of a header for the content distributor tools.

Key service 122 includes a system call and service library for rendering application to make requests to the trusted platform 110 for decrypting the header (e.g., header 1300 in FIG. 13). The application should make a system call through the service library to obtain the content encryption key for the header of the encrypted content data. The key service 122 would in turn call the key manager 118 to decrypt the header using the private key 126. With a returned clear header, the key service 122 would make sure the requested application is the trusted and targeted rendering application by matching the AAD 140 stored in the process data with at least one of the AAD (e.g., AAD1 1350, et al) and public key (e.g., pub VK1 1360, et al) from the list in the content header (e.g., content header 178).

Broadly, with respect to content encryption and authorization in the trusted platform 110, sensitive content is encrypted by the content distributor 114 for specified (or target) rendering application for a given (or target) trusted platform 110. A public key from the target platform is used to encrypt a secret that is in turn used to encrypt the content. The content is shipped to a customer and viewed using the rendering application on the target trusted platform. The rendering application requests the trusted platform OS to provide services for encrypting the secret that is used to encrypt the content. The trusted platform OS is responsible to make sure that the secret can only be revealed to the trusted, target rendering application. To associate the content with the target application, the AAD 140 is used, so that only the applications with the AAD 140 are allowed to access the sensitive contents.

Figure 14:
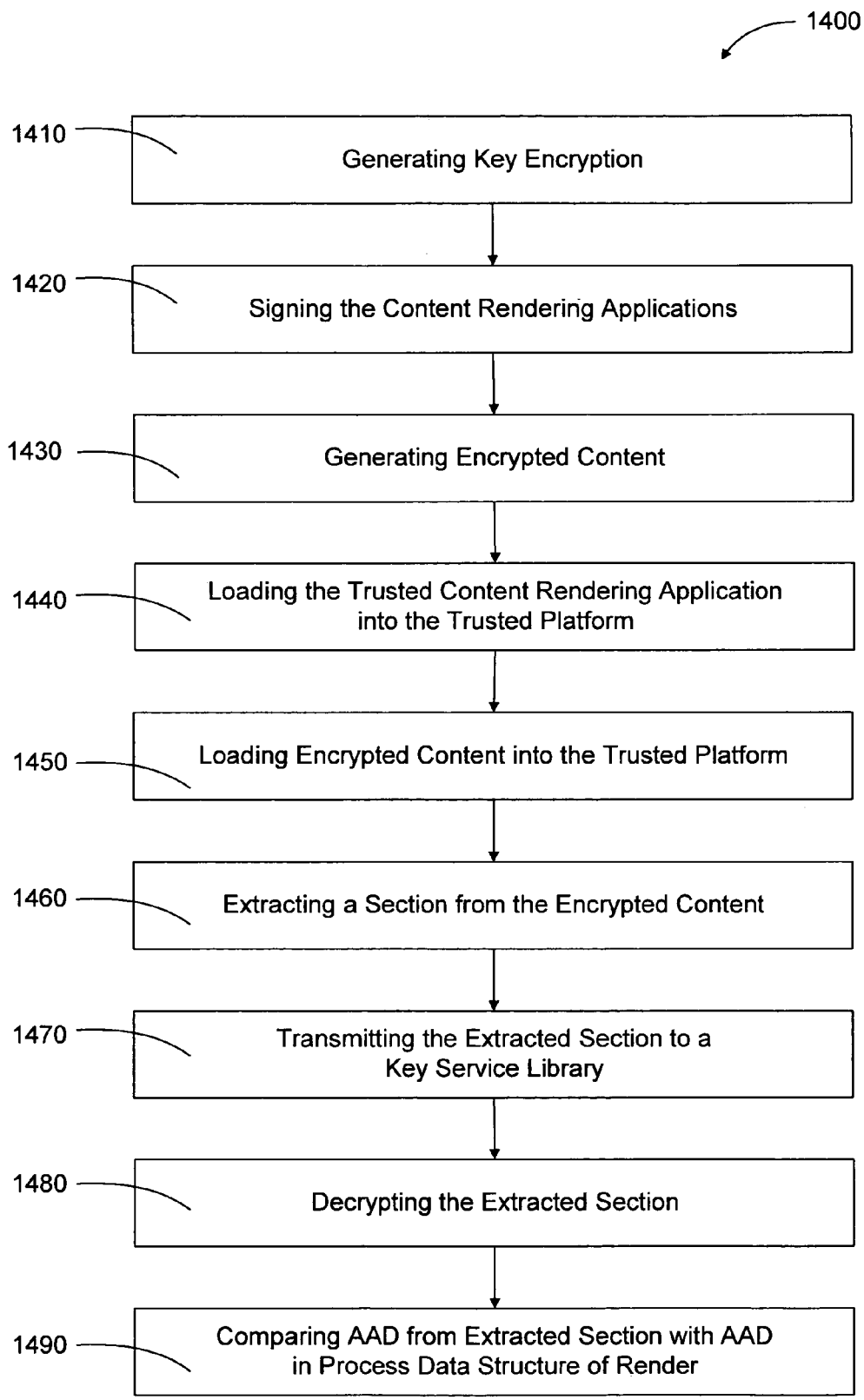
FIG. 14 is block flow diagram employing various embodiments of the invention for content encryption including authorization, decryption and protection.

Referring now to FIG. 14, there is seen a block flow diagram, generally illustrated as 1400, for illustrating an embodiment of the invention for content encryption including authorization, decryption and protection. In accordance with block 1410, a pair of key encryption is generated. More specifically the private key 160 and the public key 164 is generated. The private key 160 is handled by key manager 118, and should never be exposed. The public key 126 will be used by content distributor 114 for encrypting a content encryption key (usually a symmetric key generated on-the-fly). Preferably, the model (secret encryption) key (mSEK) is employed.

In block 1420 the elfer 148 is used to sign the content rendering applications, preferably by appending EELF sections at the end of the application. One of sections contents includes AAD 140. The content distributor tools 114, as best illustrated by block 1430, take the clear content 174, the public key (and AAD) 168 and generate encrypted content 182 with the header 178. The header 178 includes the AAD 140 and the content encryption key (DEK) 136, which is usually a symmetric key. The header 178 is encrypted using the public mSEK key 164. The content 182 following the header 178 is encrypted using the content encryption key 136.

In accordance with block 1440, the trusted content rendering application composed in block 1420 is loaded into the trusted platform 110. The trusted application should make necessary checks and store the AAD 140 from the EELF sections of EELF 156 in the process data structure. After the trusted content rendering application of block 1420 is loaded into the trusted platform 110, the trusted content render 132 (see block 1450) loads into trusted platform 110 encrypted content, which comes from the content distributor tools 114. Assuming that the encrypted content is stored in a local disk of the trusted platform 110, the trusted content render 132, as illustrated by block 1460, initially extracts the header portion from the encrypted content 182. Library or development kits (not shown) may be provided for a content rendering software developer. In accordance with block 1470, the extracted header is sent to the key service library through a system call, which in turn requests the key manager 118 to decrypt the header in accordance with block 1480. The key service 122, as illustrated by block 1490, checks the AAD 140 from the header and compares the AAD 140 with the AAD in the process data structure of the render. If they match and the application is trusted, the decrypted content key is returned to the request rendering application. Finally, the application may be decrypted and the content played.

In an embodiment of the invention, AAD 140 with the render application may be used to authorize to access encrypted sensitive data or contents. Because EELF (e.g., EELF 156) may also be included in trusted share libraries, it may include the same AAD 140 into the libraries that are used by the render applications and would require the application loader and key service 122 to check the AAD of the libraries.

In an embodiment of the present invention the trusted platform 110 may be trusted by sensitive applications for providing necessary protections from unauthorized accesses. This would include protecting memory accesses through various interfaces and swapped pages. The code space of sensitive applications is preferably protected from being accessed or altered without authorization. An example of a sensitive application would be DVD player software which would need the operating system (OS) to provide protections to licensed contents and other sensitive information that the software handles. This data may be decrypted into clear contents and rendered in the applications' memory space. The trusted platform 110 preferably protects the data from being accessed without authorization by any other processes running in the system, including processes with root privileges.

The owner of the trusted platform 110 preferably has physical access to the platform and operating system root privileges. The ownership model to the trusted platform module specified by a Trusted Computing Group (TCG) is preferably honored. Thus, the trusted platform 110 preferably has a single owner who has the authorization data to prove the ownership of the trusted platform module, therefore ownership of the trusted platform 110. Preferably, however, each entity bound to the trusted platform module would have specific authorization data which may not be accessible by the module owner. A trusted platform vendor may have special authorization data to access a set of maintenance capabilities to the trusted platform 110, which are known only to the specific platform vendor.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for authorizing an application program, the method comprising:
   determining an application program, the application program including application authorization data (AAD) stored in software code for the application:
   storing the software code in a code storage space protected from accesses or alterations without authorization:
   receiving a request from the application program for a secret that is used to decrypt content:
   determining, at a target entity, a secure file including the secret, the secure file being encrypted using a secure key associated with the target entity, the secure file including the AAD, the AAD being a string that is not associated with a secure key of a target entity;
   decrypting the secure file using the secure key;
   determining the AAD that is included in the application program stored in the code storage space;
   determining the AAD in the secure file that has been decrypted using the secure key;
   comparing the AAD determined from the secure file and the AAD determined from the application program; and
   exposing the secret to the application program if the AAD match the AAD from the application program.

2. The method of claim 1, wherein the AAD is an identifier for the application program.

3. The method of claim 2, wherein multiple application programs may be associated with the AAD and can access the secret.

4. The method of claim 1, wherein the AAD is combined with a certificate associated with a signature of the application program, the AAD combined with the certificate being stored in the secure file, the certificate being different from a certificate used to encrypt the secure file.

5. The method of claim 4, further comprising:
   determining the AAD and the certificate in the secure file that has been decrypted;
   comparing the AAD and certificate determined from the secure file and the AAD and a certificate determined from the application program; and
   exposing the secret to the application program if the AAD and certificate match from the secure file the AAD and certificate from the application program.

6. The method of claim 1, wherein the AAD comprises a string and a domain name associated the application, wherein the domain name matches a domain name found in a certificate associated with the application program.

7. The method of claim 6, wherein the domain name associates the application program with a vendor, wherein different vendors are associated with different domain names.

8. The method of claim 1, wherein the AAD stored in software code for the application is stored in the application executable of the application.

9. An apparatus configured to authorize an application program, the apparatus comprising:
   one or more processors; and
   logic encoded in one or more tangible media for execution by the one or more processors and when executed operable to:
   determine an application program, the application program including application authorization data (AAD) stored in software code for the application:
   store the software code in a code storage space protected from accesses or alterations without authorization:
   receive a request from the application program for a secret that is used to decrypt content;
   determine, at a target entity, a secure file including the secret, the secure file being encrypted using a secure key associated with the target entity, the secure file including the AAD, the AAD being a string that is not associated with a secure key of a target entity;
   decrypt the secure file using the secure key;
   determine the AAD that is included in the application program stored in the code storage space;
   determine the AAD in the secure file that has been decrypted using the secure key;
   compare the AAD determined from the secure file and the AAD determined from the application program; and
   expose the secret to the application program if the AAD match the AAD from the application program.

10. The apparatus of claim 9, wherein the AAD is an identifier for the application program.

11. The apparatus of claim 10, wherein multiple application programs may be associated with the AAD and can access the secret.

12. The apparatus of claim 9, wherein the AAD is combined with a certificate associated with a signature of the application program, the AAD combined with the certificate being stored in the secure file, the certificate being different from a certificate used to encrypt the secure file.

13. The apparatus of claim 12, wherein the logic if further operable to:
   determine the AAD and the certificate in the secure file that has been decrypted;
   compare the AAD and certificate determined from the secure file and the AAD and a certificate determined from the application program; and
   expose the secret to the application program if the AAD and certificate match from the secure file the AAD and certificate from the application program.

14. The apparatus of claim 9, wherein the AAD comprises a string and a domain name associated the application, wherein the domain name matches a domain name found in a certificate associated with the application program.

15. The apparatus of claim 14, wherein the domain name associates the application program with a vendor, wherein different vendors are associated with different domain names.

16. Software encoded in one or more computer-readable media for execution by the one or more processors and when executed operable to:
   determine an application program, the application program including application authorization data (AAD) stored in software code for the application:
   store the software code in a code storage space protected from accesses or alterations without authorization:
   receive a request from the application program for a secret that is used to decrypt content:
   determine, at a target entity, a secure file including the secret, the secure file being encrypted using a secure key associated with the target entity, the secure file including the AAD, the AAD being a string that is not associated with a secure key of a target entity;

decrypt the secure file using the secure key;

determine the AAD that is included in the application program stored in the code storage space;

determine the AAD in the secure file that has been decrypted using the secure key;

compare the AAD determined from the secure file and the AAD determined from the application program; and expose the secret to the application program if the AAD match the AAD from the application program.

17. The software of claim 16, wherein the AAD is an identifier for the application program.

18. The software of claim 17, wherein multiple application programs may be associated with the AAD and can access the secret.

19. The software of claim 16, wherein the AAD is combined with a certificate associated with a signature of the application program, the AAD combined with the certificate being stored in the secure file, the certificate being different from a certificate used to encrypt the secure file.

20. The software of claim 19, further operable to:

determine the AAD and the certificate in the secure file that has been decrypted;

compare the AAD and certificate determined from the secure file and the AAD and a certificate determined from the application program; and expose the secret to the application program if the AAD and certificate match from the secure file the AAD and certificate from the application program.

21. The software of claim 16, wherein the AAD comprises a string and a domain name associated the application, wherein the domain name matches a domain name found in a certificate associated with the application program.

* * * * *